United States Patent
Schneider et al.

[15] 3,680,398
[45] Aug. 1, 1972

[54] TORQUE CONVERTER POWER TRANSMISSION HAVING REGULATING VALVE MEANS

[72] Inventors: Raymond C. Schneider, Rockford; Robert W. Meyer, Pecatonica, both of Ill.

[73] Assignee: Twin Disc Incorporated, Racine, Wis.

[22] Filed: Aug. 13, 1971

[21] Appl. No.: 171,428

Related U.S. Application Data

[63] Continuation of Ser. No. 550, Jan. 5, 1970, abandoned.

[52] U.S. Cl. ...................74/733, 192/3.57, 192/3.33, 192/103 FA
[51] Int. Cl. .............................................B60k 21/00
[58] Field of Search ......74/733, 732; 192/3.33, 3.57, 192/3.58

[56] References Cited
UNITED STATES PATENTS

| | | |
|---|---|---|
| 3,326,066 | 6/1967 | Murphy.......................192/3.33 |
| 3,384,209 | 5/1968 | Murphy.......................192/3.33 |
| 3,469,663 | 9/1969 | Hilpert et al.................192/3.33 |

*Primary Examiner*—Benjamin W. Wyche
*Attorney*—James E. Nilles

[57] ABSTRACT

A power transmission having a torque converter which is driven from a hydraulically actuated, modulatable friction clutch, and a fluid power control system for such a transmission and which prevents the impeller of the torque converter from turning over backwards when the direction of travel of the vehicle is reversed. The control system includes control valve mechanism which insures that a minimum pressure will be acting on the impeller during the direction reversing shift to thereby prevent the impeller from being rotated backwards.

4 Claims, 2 Drawing Figures

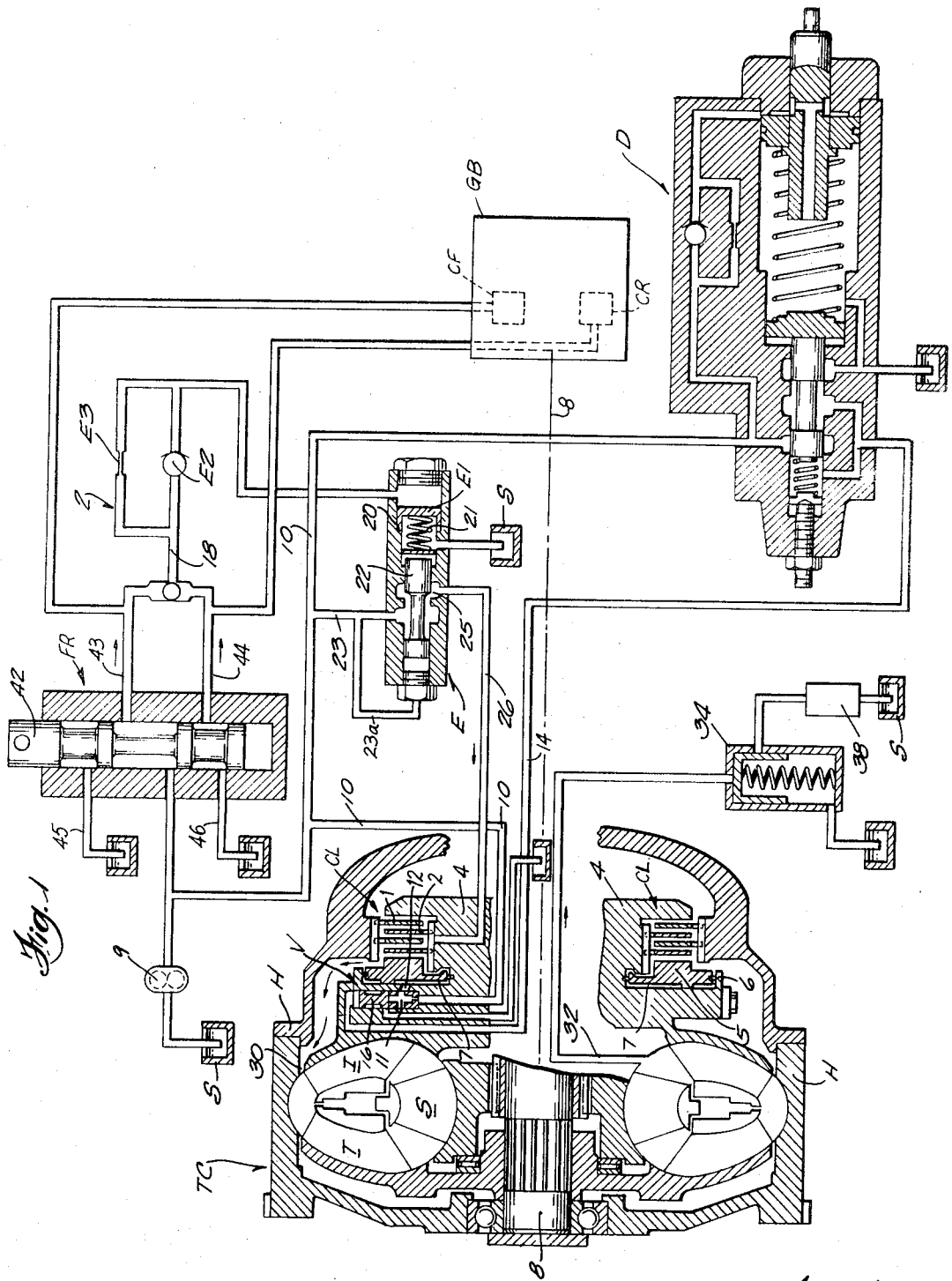

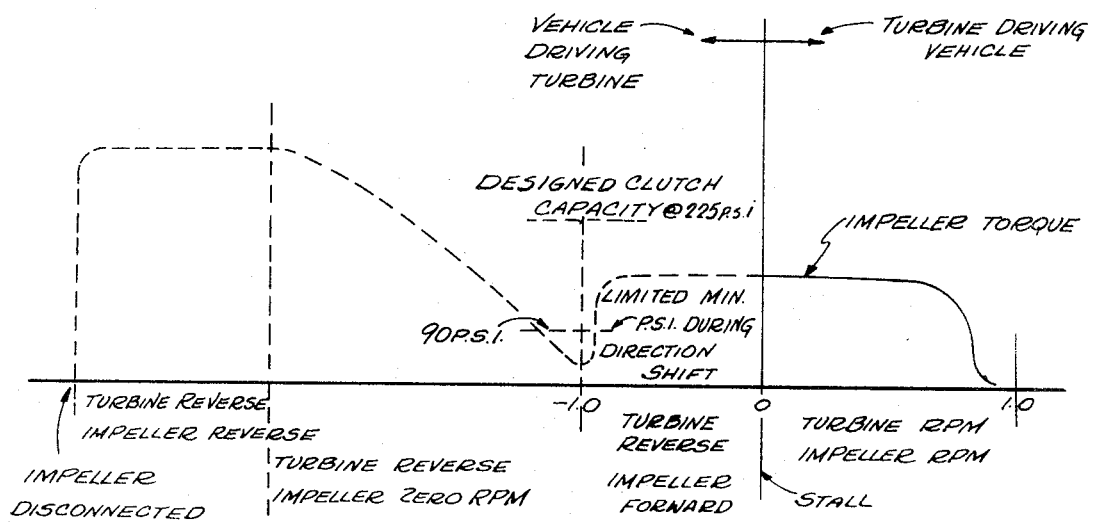

TORQUE CONVERTER POWER TRANSMISSION HAVING REGULATING VALVE MEANS

CROSS REFERENCE TO RELATED APPLICATION

This U.S. Pat. application is a continuation of U.S. Pat. application Ser. No. 550 filed Jan. 5, 1970, now abandoned, and entitled "Torque Converter Power Transmission Having Regulating Valve Means."

BACKGROUND OF THE INVENTION

The present invention finds particular utility in earth-working vehicles such as end loaders where the direction of the vehicle must be repeatedly and frequently reversed. These vehicles utilize a power transmission having a hydrodynamic torque converter which is driven from a hydraulically-actuated, modulatable clutch. These clutches are of the type that can be slippingly engaged so as to vary the amount of power transmitted to the torque converter. In such a vehicle having this type of transmission, during a shift in the direction of the vehicle, it is desirable to reduce, as much as possible, the amount of power supplied by the engine to the transmission clutches, so that the clutches are only required to accommodate the stored kinetic energy in the torque converter and the inertia energy of the components.

In the above type of vehicles, a peculiar characteristic occurs during a reversal shift which necessitates the use of a larger clutch than would otherwise be required. During the shift in directions of the vehicle, either from forward to reverse or from reverse to forward, if the modulated clutch is disconnected, then the turbine wheel is rotated backward by the vehicle wheels and transmission, and consequently the turbine flow causes the impeller to also rotate in the backward direction to a point of zero impeller torque. Then when the transmission shift is completed, the impeller must be again connected to the engine by engagement of the modulated clutch. The torque capacity required to stop the impeller and reverse its direction is considerably greater than the torque capacity required for the normal operating range wherein the turbine is driving the vehicle. In fact, the amount of torque capacity required to reverse the direction of the impeller can readily be two times its normal torque and, consequently, this requires a clutch approximately twice as large as would otherwise be necessary.

An example of such a power transmission with which the present invention finds particular utility is shown in the U.S. Pat. No. 3,469,663, issued Sept. 30, 1969 to Hilpert et al., entitled "Constant Speed Clutch and Torque Converter Transmission."

Another example of the type of modulated clutch used with the present invention is found in U.S. Pat. No. 3,352,395 to Hilpert, issued Nov. 14, 1967 and entitled "Friction Clutch Having Centrifugally Operated Valve Means."

SUMMARY OF THE INVENTION

The present invention provides a power transmission having a torque converter that is driven from a modulated clutch that is located downstream from the rotating housing of the torque converter, the clutch being of the hydraulically-actuated type and controlled by a fluid control valve so as to vary the degree of slippage of the clutch and in which transmission control means are provided for preventing the impeller of the torque converter from being driven in the reverse direction during a shift in direction of vehicle movement. More specifically, the present invention relates to a control means for insuring that a minimum amount of fluid pressure is applied to the torque converter and specifically to the impeller therefor during such a direction reversing of the vehicle. At the same time, the present invention insures that only reduced power from the engine is transmitted to the clutch during such a direction reversal shift.

These and other objects and advantages of the present invention will appear hereinafter as this disclosure progresses, reference being had to the accompanying drawings.

BRIEF DESCRIPTION OF THE DRAWINGS

FIG. 1 is a view of a power transmission including the hydraulic circuit made in accordance with the present invention;

FIG. 2 is a curve of impeller torque characteristic for a rotating housing-type torque converter utilizing the present invention, the curve being a plot of torque of the converter against the ratio of r.p.m. of the turbine of the converter impeller against the r.p.m. of the impeller.

DESCRIPTION OF THE PREFERRED EMBODIMENT

The transmission includes a hydrodynamic torque converter TC which has a rotating housing H and is of the single stage type, and an internal modulated clutch CL is located between the engine-driven housing H and the impeller I of the torque converter. The clutch is located downstream of the housing in respect to the direction of power flow. This clutch is of the slippable, friction plate type in which interleaved friction plates 1 and 2 are axially splined, respectively, to the housing H and the hub 4, which hub is, in turn, secured to the impeller I. A clutch-actuating piston 5 located in the clutch cylinder 6 is forced to the right (as viewed in FIG. 1) when the clutch-actuating chamber 7 is pressurized with fluid in the known manner. When the interleaved clutch plates are clamped firmly together, the power is transmitted from the housing H and to the impeller I of the torque converter. The torque converter then transmits the power through its turbine member T which is splined to the output shaft 8, in the known manner, and to a gear change transmission GB including hydraulically-actuated, forward clutch CF and reverse clutch CR.

The clutch is of the modulatable type, and is controlled as to its amount of slipping, by means of the valve control mechanism V which serves to control the amount of pressure fluid being admitted to the clutch-actuating chamber 7. For the purpose of actuating the clutch CL, high-pressure fluid is supplied from a fluid pressure source 9, such as a fluid pump, and via passage 10, valve chamber 11, and cross port 12 where it enters the clutch-actuating chamber 7. Control pressure fluid is also introduced to the valve V through the passage means 14 and from a modulating control valve D, to be referred to later. In any event, control pressure enters the control valve V at the radial outer side of the control spool 16 and this control pressure acting on the radially outer end of the spool, shifts it in a radial direction so as to control the amount of fluid being admitted from the passage 10 to the clutch-actuating chamber 7. If a more complete description of the control valve V is deemed to be either necessary or desirable, reference may be had to the U.S. Pat. No. 3,352,395 issued Nov. 14, 1967. This valve and a generally similar transmission is also shown in the U.S. Pat. No. 3,469,333 issued Sept. 30, 1969. It is believed sufficient to say for purposes of this disclosure, however, that the valve control V has a pressure which is set externally to give an impeller speed which is proportional to pressure, regardless of the coefficient of friction of the clutch plates. The power is thus delivered through the housing H, through the modulatable clutch CL which is controlled by the valve V and then through the torque converter and out the output shaft 8.

A high-pressure regulating valve E is provided for preventing the impeller from being reversed in direction during vehicle direction shifts. This is accomplished by a pressure signal from the forward-reverse selector valve FR which passes through the fluid communication 18, and which signal forces the piston E1 to the left where it bears against the shoulder 20 of the valve body. This movement of the piston E1 establishes a reference point for the action of the spring 21 to work from. A fluid metering piston 22 is urged against the bias of the spring by the pressure from line 23 and line 23a from the pressure in the oil supply line 10. Pressure fluid, as regulated by the valve E, is then directed via conduit 26 through the plates of the clutch outwardly as indicated by the curvilinear arrows to the point of inlet 30 for the hydraulic torque converter. The housing has been shown at its right side as being broken away for the sake of clarity in the drawings but, of course, it actually encloses the clutch CL. The torque converter outlet passage 32 feeds to a pressure regulator 34 which regulates the pressure of the converter, say, for example, to a value of 40 p.s.i. A portion of this fluid also passes through the cooler 38 and then to the sump as indicated.

The high pressure fluid supply line 10 also acts to feed the modulating valve D, which valve in turn supplies control fluid via passage 14 to the control valve V of the torque converter clutch.

Referring again to the regulating valve E, when the pressure signal from the selector valve FR forces the piston E1 to the left, the circuit pressure is regulated at maximum, say, for example, 225 p.s.i. Overflow oil from the regulator valve E passes through conduit 26 and continues through the clutch plates for cooling thereof, and then into the torque converter toroidal path, as mentioned. Movement of the selector valve FR initially dumps the pressure signal on the piston E1 to zero. That is to say, when the spool 42 of the selector valve is shifted in one direction or the other, the line 18 is momentarily dumped to the sump through valve FR. This causes one-way check valve E2 to open, that is, move to the left as shown in FIG. 1, thereby dumping the chamber behind piston E1 of valve E. This permits piston E1 to move to the right taking the pressure off spring 21 and permitting spool 22 to shift to the right to some extent. This, in effect, opens the metering area 25 of the valve thereby reducing the pressure in line 23. In other words, the spring force on the metering piston 22 reduces the clutch main pressure to a lower pressure, say, for example, 90 p.s.i. which will function to prevent the impeller I from being rotated in the backward direction. This minimum pressure considerably reduces the power transmitted through the transmission clutch.

The one-way check valve E2 and a restricted orifice E3 are arranged in parallel in the fluid communication 18 between the direction selector valve FR and the regulating valve E.

As the pressure begins to rise in the reverse clutch CR then being supplied, the check valve E2 will close and pressure will build up rather slowly as the oil flows through the orifice E3 and to the piston E1. Thus, the orifice E3 acts to delay the rebuilding of pressure behind piston E1 until the direction clutch which has just been engaged is fully engaged. This has the effect of easing the clutch CL into operation by not applying the entire pressure to the clutch CL immediately. When the pressure behind the piston E1 has risen sufficiently, the metering piston 22 will shift to the maximum line pressure position.

When the vehicle is shifted from one gear to another in the same direction of movement, the pressure on piston E1 will not be dumped and, consequently, full main line supply pressure will be available.

More specifically, the valve FR controls the forward clutch CF and the reverse clutch CR and the pressure in line 18. With the valve 42 in the position shown, pressure from the pump will go through the spool 42 and out of line 43. It will then engage the forward clutch CF and pass through line 18, seating the ball valve in the junction in the down position since line 44 is now vented to atmosphere through the lower end of spool 42. The fluid will then pass through line 2 through orifice E3 and into cavity E1. The orifice E3 will slowly fill up cavity E1 bringing the clutch CL from a low pressure back up to a full regulated 225 p.s.i. in some period of time. When the valve stem 42 is moved to the opposite or reverse direction, the lands are arranged so that during its transient period, the pressure to the forward clutch CF is vented back to the sump to the top land on the valve 42 and thence to the sump through line 45. At this moment, the high pressure in cavity E1 will exhaust back through check valve E2 and dump to the sump essentially lowering the pressure in cavity E1 to sump pressure at a very quick rate. Further travel of the stem 42 will connect the high-pressure line from pump 9 up to line 44 which will engage the reverse clutch CR feeding the ball valve at the junction to the up position and going through the same sequence of pressurizing cavity E1 as was just previously described.

The clutch plates of clutch CL were not open when the transmission was in forward (or reverse) but were fully closed and engaged and maintained at a pressure of 225 p.s.i. with appropriate clutch capacity at that pressure. When the valve stem 42 was moved from the one direction to the opposite direction, the aforementioned sequence of dumping cavity E1 would be gone through and as a result of the lowering pressure of spring 21, the apply pressure behind the piston of the clutch CL would be lowered to 90 p.s.i. and the clutch, therefore, have less capacity due to its lowered normal force. The fluid going through the clutch plates, is only for clutch coolant and converter charging and will not escape from the torque converter whether the plates are open or closed since the clutch is located inside the housing of the torque converter. With the clutch open or closed, the fluid entering the line 26 makes its way through the clutch and eventually up as shown in the arrows at the outer periphery of the clutch mechanism and through the gap 30 into the converter circuit itself where it comes out in line 32 and goes to regulator 34.

If the impeller were not depressurized to any extent, the clutch would remain fully engaged and the impeller would be driven forward but at full engine speed. This situation would not lower input HP into the following transmission clutch since the full translation of engine speed to the impeller would keep full converter output torque on the turbine shaft which would then be transmitted as power into the forward or reverse clutch that was being brought into synchronization. This situation of shifting under full converter speed would enhance power into the forward and reverse clutches to a point where it would usually cause thermal failure in the clutch.

Examination of the torques shown in FIG. 2 show a design clutch capacity line at 225 p.s.i. well above the impeller absorption torque shown from minus 1.0 speed ratio to plus 1.0 speed ratio. When the clutch is fully pressurized to 225 p.s.i., the impeller torque need is such that it will be below the capacity of the clutch, hence will stay continuously connected to the housing which is essentially the input engine. A full disengagement of the clutch during this time because the turbine is going backward and, therefore, defining a negative speed ratio as shown in FIG. 2, would cause the impeller hydraulically to slow down, stop, go through zero r.p.m. and turn in the reverse direction. While this would be fine thermally for the following transmission clutches, it would require a very large clutch CL to approach the capacity shown in the very left-hand side of FIG. 2. This capacity is obviously in excess of the line shown as design clutch capacity and therefore would require a larger clutch physically and thermally. The dropping of the clutch pressure to an arbitrary 90 p.s.i. during the shift allows the impeller to run at a slower speed than engine speed which limits the thermal energy into the following transmission clutch and makes it safe while simultaneously keeping the impeller running in the forward direction rather than let it free which would ultimately turn it in the reverse direction and force the reconnecting clutch to be very large.

RESUME

The present invention provides a power transmission having a torque converter, and a hydraulic circuit for the transmission including a high-pressure regulator valve which is responsive to the direction selector valve of the transmission.

The selector valve FR has a fluid delivering communication with the regulating valve E to automatically maintain a predetermined fluid pressure in the clutch means and this is important in a transmission of this type. More specifically, the valve FR sends a signal to the end of the modulating valve E which, in turn, automatically changes the magnitude of the pressure being delivered to the actuating chamber of the modulating clutch CL.

Arrangement is such that when the selector valve is operated to change the direction of power output of the transmission, the regulator valve insures that all of the pressure is not taken off of the clutch. If all of the pressure were removed from the clutch, this would cause the impeller of the torque converter to rotate in the backward direction due to the moving parts of the vehicle or the like to which the transmission is attached. The pressure regulator valve of the present invention insures that there is a minimum pressure on the impeller when a direction shift is made.

We claim:

1. A power transmission having a rotating housing-type torque converter, a hydraulically-actuated clutch means within the rotating housing and downstream of the housing in respect to the direction of power flow for controlling the operation of said converter, an output member, and gear change mechanism driven by said output member and having hydraulically-actuated forward and reverse clutches; a hydraulic circuit for said transmission and comprising, a control valve for controlling the pressure fluid admitted to said clutch means, a source of high pressure fluid in said circuit for supplying pressure fluid to said control valve, a high-pressure regulating valve in fluid-receiving communication with said source of high-pressure fluid and in fluid-delivering communication with said torque converter, a forward-reverse selector valve having outlets selectively connectable to said forward and reverse clutches of said gear change transmission for selecting the direction of power output of said transmission, said selector valve having said outlets connected directly to said regulating valve, said regulating valve having a fluid communication with said clutch means for regulating the amount of pressure fluid delivered to said clutch means whereby when said selector valve is operated to change the direction of the power output, the pressure in one of said outlets is changed whereby said regulating valve automatically maintains a reduced predetermined fluid pressure in said clutch means during said direction shift.

2. The transmission set forth in claim 1 further characterized in that said fluid communication between said selector valve and said regulating valve includes a one-way check valve in parallel with a restricted orifice.

3. A vehicle power transmission having a torque converter, a rotatable housing for said converter, a hydraulically-actuated modulatable clutch means in said housing and downstream of said housing in respect to the direction of power flow for controlling the operation of said converter, an output member, and gear change mechanism driven by said output member and having hydraulically-actuated forward and reverse clutches; a hydraulic circuit for said transmission and comprising, a control valve in said housing for controlling the pressure fluid admitted to said clutch means for modulation thereof, a source of high-pressure fluid in said circuit for supplying pressure fluid to said control valve, a manually-operated modulating valve in fluid-delivering communication with said control valve and in fluid-receiving communication with said source of pressure fluid, a high-pressure regulating valve in fluid-receiving communication with said source of high-pressure fluid and in fluid-delivering communication with said torque converter, a forward-reverse selector valve for said forward and reverse clutches of said gear change mechanism for selecting the direction of travel of said vehicle, said selector valve having a fluid-delivering communication with said regulating valve, said regulating valve having a fluid communication with said clutch means for regulating the amount of pressure fluid delivered to said clutch means, whereby when said selector valve is operated to change the direction of travel of said vehicle, said regulating valve automatically maintains a reduced predetermined fluid pressure in said clutch means during said direction shift.

4. The transmission set forth in claim 3 further characterized in that said fluid communication between said selector valve and said regulating valve includes a one-way check valve in parallel with a restricted orifice.

* * * * *